United States Patent [19]

du Preez

[11] Patent Number: 5,451,743
[45] Date of Patent: Sep. 19, 1995

[54] HEATING TILE

[75] Inventor: Johannes J. du Preez, Potchefstroom, South Africa

[73] Assignee: Denel (PTY) Limited T/A Naschem, Pretoria, South Africa

[21] Appl. No.: 977,803

[22] Filed: Nov. 17, 1992

[30] Foreign Application Priority Data

Nov. 19, 1991 [ZA] South Africa ............ 91/9141

[51] Int. Cl.⁶ ............................................. B32B 9/00
[52] U.S. Cl. ................................... 219/200; 219/201
[58] Field of Search .................... 219/200, 201, 46

[56] References Cited

U.S. PATENT DOCUMENTS

| | | | |
|---|---|---|---|
| 2,107,598 | 2/1938 | Colvin, Jr. | 219/46 |
| 2,722,596 | 11/1955 | Drouet | 219/201 |
| 3,597,585 | 8/1971 | Ohno | 219/201 |
| 4,252,849 | 2/1981 | Nishimura et al. | 219/201 |

Primary Examiner—Patrick J. Ryan
Assistant Examiner—Kam F. Lee
Attorney, Agent, or Firm—Young & Thompson

[57] ABSTRACT

Heating tiles have electrical resistance wires on their under surfaces which are covered with a non-conducting sheet, adjacent tiles being physically and electrically connected to provide any chosen area for heating such as the bottom of a bird cage, kennel or for heating blankets.

3 Claims, 3 Drawing Sheets

HEATING TILE

FIELD OF THE INVENTION

This invention relates to a heating tile.

OBJECT OF THE INVENTION

It is an object of the present invention to provide a tile having heating means which may be joined to tile heating means of other tiles with transfer of the heating means between tiles so that a heated surface of desired area may be provided.

The invention is particularly suited for animal cages, kennels and the like enclosures but it will be appreciated that it may be used for human housing, offices and many other applications such as bed heaters, bathroom surfaces, heating of pipes and the like.

THE INVENTION

According to the invention tiles are provided which include heating means incorporated therein, the heating means being connectable to heating means of adjacent tiles.

The heating means may be a flow of heated fluid such as oil or water but it is preferred that tile heating means comprises electrically heated elements embedded, printed, or otherwise incorporated into the tiles. The heating elements may be silk-screened on to the tiles.

The tiles may be of any suitable size having regard to the application and may include interengaging formations for a physical connection as well as the electrical connection.

In a preferred form of the invention each tile has resistance wires on their lower surfaces and these are connectable to the resistance wires of the adjacent tiles when the tiles are joined together. The physical connection elements may include electrical connections.

In one form of the invention the lower surfaces having the resistance wires are covered with a sheet of electrically non-conductive material or another tile without resistance wires.

Tiles of the order of 10 cm square are useful for bird cages or dog baskets or as electric blankets for humans, The uses of an assembly of the tiles of the invention are extensive.

EMBODIMENT OF THE INVENTION

An embodiment of the invention is described with reference to the accompanying drawings.

Figure 1:
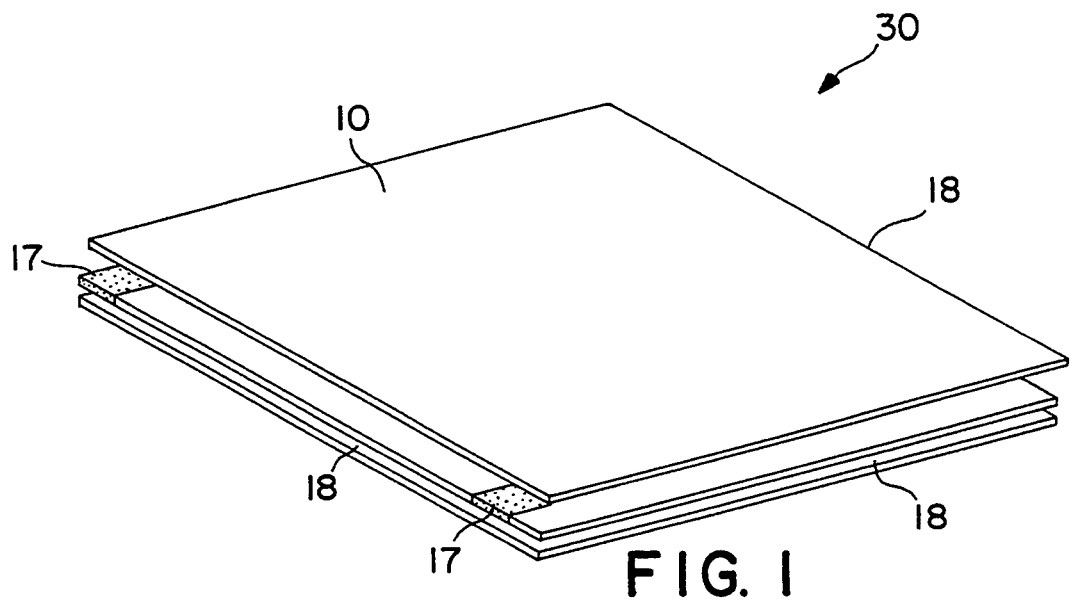
FIG. 1 is an isometric view of the tile according to the invention.
Figure 2:
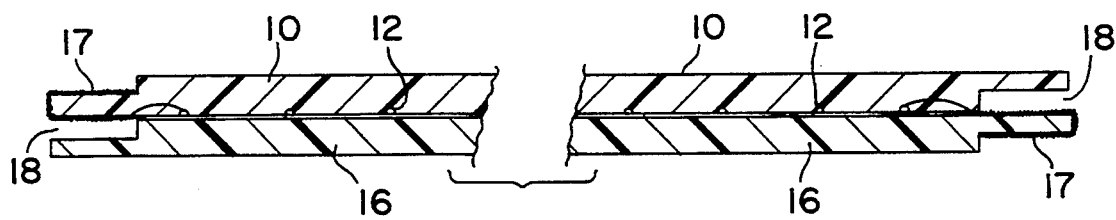
FIGS. 2 and 3 are enlarged sectional views of the tile.

In the drawings tiles 30 are provided in the form of a square and are constructed from two halves 10 and 16. Resistance wires or electrical elements 12 are either attached or embedded into the lower surface of the upper half 10, and extend to contact pads 17 which are located on one interengaging connection formation 18 as illustrated in FIG. 1. The two halves 10 and 16 are then either glued, or welded by ultrasonic means or solvents so as to seal the electrical element from moisture ingress.

Figure 3:
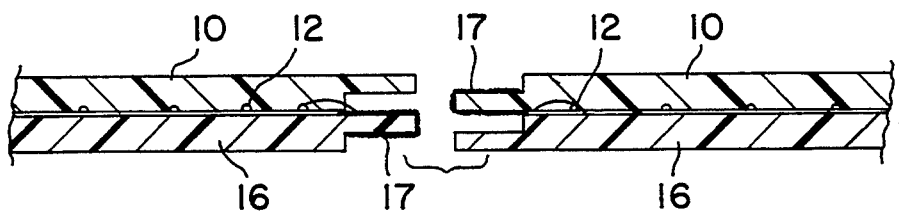

Reference to FIG. 3 shows how the interengaging connection formations slot into each other allowing the copper contact pads 17 to connect the circuits between tiles.

Figure 4:
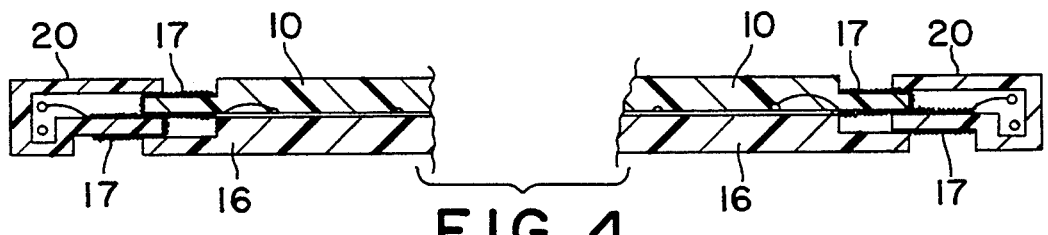
FIG. 4 is a similar view showing the peripheral connection elements in part engagement with the tiles.

In FIG. 4 the sectional view shows how the elements may be connected to a supply of low voltage current. Conduits 20 are provided which also have matching interengaging formations to the tiles and likewise also include contact pads 17, so that a very neat and convenient method of constituting a large heating surface may be provided.

The conduits in this drawing are shown in part engagement and it will be readily appreciated that when completely engaged they will create a very firm and compact border to the heating pad. The joints between the tiles may, if required, be sealed by any suitable compound.

Figure 5:
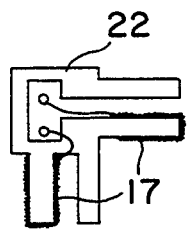
FIG. 5 is an end view of a corner connection element.
Figure 6:
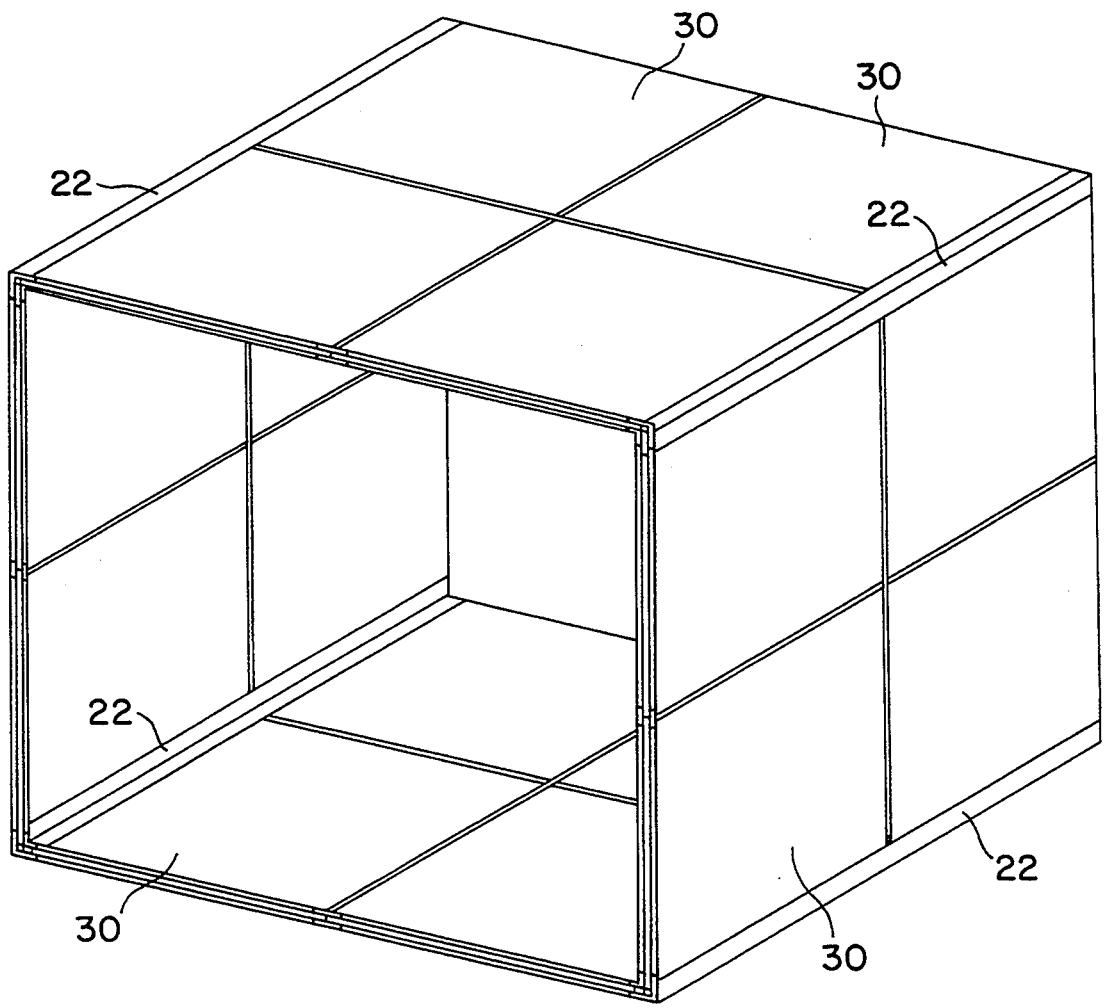
FIG. 6 is an isometric view of an assembly of tiles into a box formation.

In FIG. 5 the corner connector and conduit 22 is shown which allows an enclosed space to be heated. This feature of the invention is shown in FIG. 6 where a box is assembled using a number of tiles together with corner connections. This facility will provide ideal incubation chambers for laboratories where a great demand exists for controlled temperature cabinets.

Figure 7:
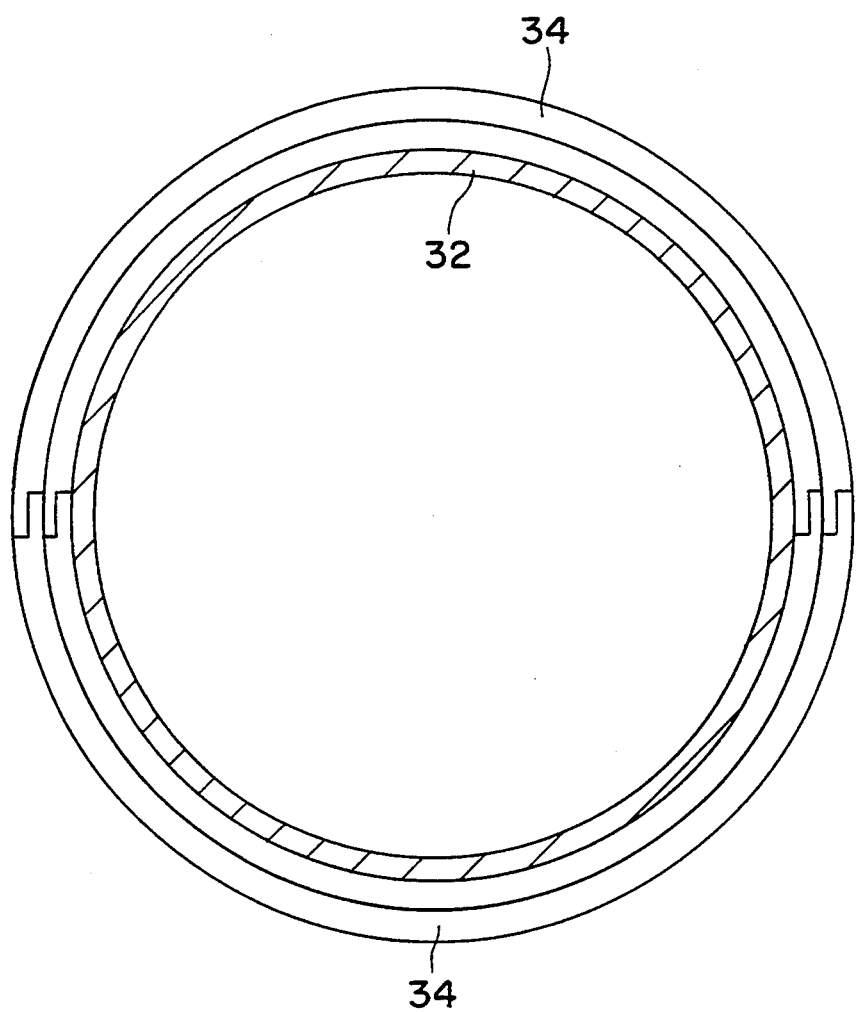
FIG. 7 is a sectional end view of a pipe with curved tiles.

Referring to FIG. 7 a pipe 32 is shown covered by curved heating tiles 34. This application will facilitate the flow of viscous liquids along pipe lines in food processing or other industrial uses.

The assembly of tiles is connected to a source of electricity depending on what source is available and, if necessary the source may be transformed. A variable resistance or equivalent may be provided to adjust the temperature of the tiles.

The tiles of the invention may be flexible or deformable for greater versatility—for example for cladding pipes and other non-planar shapes.

I claim:

1. Heating tiles including a heating element comprising an electrical resistance circuit connectable to a source of electricity and incorporated into the tiles, the tiles being mechanically and electrically connectable to each other by means of interengaging tongues and grooves.

2. Heating tiles according to claim 1, in which the electrical resistance circuit is located on the undersurface of the tile and is covered on the undersurface thereof with a non-conducting layer.

3. Heating tiles according to claim 2, in which the electrical resistance circuit is applied by silkscreening.

* * * * *